US009762949B2

(12) United States Patent
Beemster et al.

(10) Patent No.: US 9,762,949 B2
(45) Date of Patent: Sep. 12, 2017

(54) METHODS OF DISPLAYING AN ELECTRONIC PROGRAM GUIDE

(71) Applicant: Echostar Technologies L.L.C., Englewood, CO (US)

(72) Inventors: Michiel Beemster, Almeo (NL); David Bonfrer, Almelo (NL); Marcel Westenbroek, Almelo (NL)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 15/080,189

(22) Filed: Mar. 24, 2016

(65) Prior Publication Data

US 2016/0205432 A1 Jul. 14, 2016

Related U.S. Application Data

(62) Division of application No. 13/237,772, filed on Sep. 20, 2011, now Pat. No. 9,325,965.

(30) Foreign Application Priority Data

Sep. 20, 2010 (EP) .................................... 10177592

(51) Int. Cl.
*H04N 21/431* (2011.01)
*H04N 13/00* (2006.01)
*G06F 3/01* (2006.01)
*H04N 9/31* (2006.01)
*H04N 21/258* (2011.01)
(Continued)

(52) U.S. Cl.
CPC ......... *H04N 21/4312* (2013.01); *G06F 3/013* (2013.01); *G06T 7/004* (2013.01); *H04N 9/3141* (2013.01); *H04N 9/3179* (2013.01); *H04N 13/007* (2013.01); *H04N 13/0438* (2013.01); *H04N 21/25891* (2013.01); *H04N 21/4122* (2013.01); *H04N 21/4223* (2013.01); *H04N 21/4532* (2013.01); *H04N 21/4821* (2013.01); *H04N 2013/0463* (2013.01); *H04N 2013/0465* (2013.01)

(58) Field of Classification Search
None
See application file for complete search history.

(56) References Cited

U.S. PATENT DOCUMENTS 6,097,441 A * 8/2000 Allport ................ H04N 5/4401
348/120
6,637,883 B1 * 10/2003 Tengshe ................ A61B 3/113
351/210

(Continued)

*Primary Examiner* — Nathan Flynn
*Assistant Examiner* — Alexander Q Huerta
(74) *Attorney, Agent, or Firm* — LK Global

(57) ABSTRACT

A method of displaying an electronic programming guide, comprising: outputting a video signal from a receiver to a display device, the video signal including program service content for display on the display device; receiving a signal at the receiver, the signal including a command to display an electronic programming guide; in response to receiving the signal, determining if there is at least one viewer of the display device that does not want to view the electronic programming guide; and in response to determining that there is at least one viewer that does not want to view the electronic programming guide, projecting the electronic programming guide from the receiver to a projection surface.

5 Claims, 7 Drawing Sheets

(51) Int. Cl.
*H04N 21/4223* (2011.01)
*H04N 21/45* (2011.01)
*H04N 21/482* (2011.01)
*H04N 21/41* (2011.01)
*H04N 13/04* (2006.01)
*G06T 7/00* (2017.01)

(56) References Cited

U.S. PATENT DOCUMENTS

| | | | |
|---|---|---|---|
| 8,130,330 B2 * | 3/2012 | Tan | H04N 5/144 345/629 |
| 9,508,194 B1 * | 11/2016 | Worley, III | G06F 3/012 |
| 2002/0019980 A1 * | 2/2002 | Kikinis | H04N 5/44543 725/39 |
| 2007/0165964 A1 * | 7/2007 | Wolf | G06F 9/4443 382/276 |
| 2008/0082998 A1 * | 4/2008 | Han | H04N 5/4403 725/39 |
| 2009/0081950 A1 * | 3/2009 | Matsubara | H04H 60/80 455/3.06 |
| 2010/0146077 A1 * | 6/2010 | Davies | G06F 17/30817 709/219 |
| 2010/0153996 A1 * | 6/2010 | Migos | G06F 3/0425 725/39 |
| 2010/0245680 A1 * | 9/2010 | Tsukada | H04N 5/4403 348/734 |
| 2011/0157484 A1 * | 6/2011 | D'Alessio | H04N 9/3144 348/744 |
| 2012/0090005 A1 * | 4/2012 | Marlow | G06Q 30/0241 725/42 |
| 2013/0340005 A1 * | 12/2013 | Kwan | H04N 5/44543 725/39 |
| 2014/0002352 A1 * | 1/2014 | Jacob | G06F 3/013 345/156 |
| 2014/0123162 A1 * | 5/2014 | Karlsson | H04N 21/4331 725/12 |
| 2014/0334666 A1 * | 11/2014 | Lankford | G06F 3/013 382/103 |

* cited by examiner

METHODS OF DISPLAYING AN ELECTRONIC PROGRAM GUIDE

This application is a Division of U.S. patent application Ser. No. 13/237,772, filed Sep. 20, 2011, which in turn claims priority to European Patent Application No. 10177592.2 filed Sep. 20, 2010, entitled "Method of Displaying an Electronic Program Guide," both of which are hereby incorporated by reference herein in their entirety.

The present invention relates to methods of displaying an electronic program guide. For example, methods of the invention separate the display of the electronic program guide from the program content.

Cable television, satellite television, and other providers of program services typically include functionality for display of program guide information in their services. Program guide information may be viewed through an "electronic program guide" (EPG) menu that is enabled by a user through input to a receiver sent through an input device such as a remote control. The electronic program guide data typically includes program schedules, having such information as program channels and times in which various programs may be viewed on a particular channel. An EPG guide may be output in graphical form by way of a grid having channels corresponding to rows and time slots in the various columns of the grid. Once a user commands a receiver to display EPG guide information, the requested information is displayed as an overlay or otherwise over a portion of a display that is used to view a channel or other visual content from a broadcast service.

In some instances, the overlay of the EPG may interfere or partially interfere with viewing of a program service channel. This interference with the program service channel may be disruptive to one or more viewers. Specifically, the user input device may be operated by one individual who alone wishes to view the EPG. Others who are concurrently watching the television may not wish to view the EPG and may thereby have their viewing experience disrupted.

The present invention seeks to address this problem.

According to the present invention, there is provided a method of displaying an electronic programming guide, the method comprising:

outputting a video signal from a receiver to a display device, the video signal including program service content for presentation on the display device;

receiving a command signal at the receiver, the command signal commanding the receiver to display an electronic program guide;

and the receiver providing the electronic program guide in a manner such that its display does not interfere with the presentation of the program service content on the display device for some viewers;

wherein the electronic program guide is displayed on a first display surface which is distinct from a second display surface on which the program service content is displayed.

Embodiments of the invention enable the EPG to be displayed on the first display surface whilst the program continues on the second display surface. Therefore, the display of the EPG does not interfere with the presentation of the program content.

In an embodiment, where images on the display device are to be viewed using headsets, the first display surface is provided by a first headset and the second display surface is provided by a second headset.

Alternatively, the second display surface on which the program service content is presented is provided on the display device, and the first display surface on which the electronic program guide is displayed is a projection surface onto which the electronic program guide is projected by the receiver.

In a further embodiment, the second display surface on which the program service content is presented is provided on the display device, and the first display surface on which the electronic program guide is displayed is a display surface of a headset.

In an embodiment, altered 3D output signals are used such that one frequency of the output signal from the receiver contains an EPG data image and a second frequency of the 3D output signal contains visual content from the broadcast service transmission.

In another embodiment, an EPG is periodically inserted into video stream during predetermined frames, which are then captured and held by a synchronized headset.

In an alternative embodiment, an EPG image is output through a projector onto a projection surface.

In an embodiment, the method further comprises in response to receiving the command signal at the receiver, outputting a third signal and a fourth signal from the receiver, the third signal including program service content and the fourth signal including electronic program guide data; wherein the third and the fourth signal cause the electronic program guide to be visible on the first display surface and cause the program service content to be visible on the second display surface.

Preferably, the video signal is a combination of a first signal component on a first frequency and a second signal component on a second frequency, the first signal component and the second signal component together cause the display device to output an image that when viewed with a headset produces a three-dimensional image for the program service content;

the third signal is transmitted on the first frequency and the fourth signal is transmitted on the second frequency, the third and the fourth signal are sent to the display device to produce an image that is viewed with the aid of a first headset containing the first display surface and a second headset containing the second display surface;

the first headset filtering out content from the third signal and passing content from the fourth signal to produce the electronic program guide; and the second headset filtering out content from the fourth signal and passing content from the third signal to produce a two-dimensional image for the program service content.

In an embodiment, the method further comprises receiving a fifth signal at the receiver, the fifth signal including a command to exit the electronic program guide; and in response to the command to exit the electronic program guide, outputting a sixth signal from the receiver to the display device, the sixth signal including program service content for display on the display device, wherein the sixth signal is a combination of a first signal component on the first frequency and a second signal component on the second frequency, the first signal component and the second signal component together cause the display device to output an image that when viewed with a headset produces a three-dimensional representation for the program service content.

In an embodiment, the third and fourth signals may be combined, and the resultant combined signal may be output from the receiver to the display device.

Preferably, the display device includes the second display surface, and the third signal is sent to the display device to produce a program service image visible without the aid of a headset; and the fourth signal is sent to the display device to produce an electronic program guide image that is visible with the aid of a first headset which includes the second display surface.

In this embodiment, the method may further comprise sending one frame of electronic program guide data on the fourth signal each time the third signal sends a predetermined number of video frames; and outputting a synchronization signal from the receiver to the first headset, the synchronization signal corresponding to the occurrence of the electronic program guide frame in the fourth signal;

wherein the headset uses the synchronization signal to capture an image produced by the display device when the display device outputs an electronic program guide frame and to hold the captured image when display device does not output an electronic program guide frame.

In an embodiment, the display device includes the second display surface and the third signal is sent to the display device to produce a program service image; and the first display surface is a surface of an object external to the receiver and the fourth signal is sent to a projector component of the receiver which projects an electronic program guide image onto the first display surface.

The present invention also extends to a method of displaying an electronic programming guide, comprising: outputting a first signal from a receiver to a display device, the first signal including program service content for display on the display device; receiving a second signal at the receiver, the second signal including a command to display an electronic programming guide; and in response to receiving the second signal at the receiver, outputting a third signal and a fourth signal from the receiver, the third signal including program service content and the fourth signal including electronic programming guide data; wherein the third and the fourth signal cause the electronic programming guide to be visible on a first display surface and cause the program service content to be visible on a second display surface.

For example, where the first signal is a combination of a first signal component on a first frequency and second signal component on a second frequency, the first signal component and the second signal component together cause the display device to output an image that when viewed with a headset produces a three-dimensional image for the program service content;

the third signal is transmitted on the first frequency and the fourth signal is transmitted on the second frequency, the third and the fourth signal are sent to the display device to produce an image that is viewed with the aid of a first headset containing the first display surface and a second headset containing the second display surface;

the first headset filtering out content from the third signal and passing content from the fourth signal to produce the electronic programming guide; and the second headset filtering out content from the fourth signal and passing content from the third signal to produce a two-dimensional image for the program service content.

In an embodiment, the method further comprises:

receiving a fifth signal at the receiver, the fifth signal including a command to exit the electronic programming guide; and in response to the command to exit the electronic programming guide, outputting a sixth signal from the receiver to the display device, the sixth signal including program service content for display on the display device, wherein the sixth signal is a combination of a first signal component on the first frequency and a second signal component on the second frequency, the first signal component and the second signal component together cause the display device to output an image that when viewed with a headset produces a three-dimensional representation for the program service content.

Alternatively, the method may further comprise:

combining the third and the fourth signal at the receiver to form a combined signal; and outputting the combined signal from the receiver to the display device.

In an embodiment, the method further comprises:

separately outputting the third and fourth signals from the receiver;

receiving the third and fourth signals at the display device; and combining the third and the fourth signals at the display device.

Preferably, the display device includes the second display surface, and the third signal is sent to the display device to produce a program service image visible without the aid of a headset; and the fourth signal is sent to the display device to produce an electronic programming guide image that is visible with the aid of a first headset which includes the second display surface.

Preferably, the method further comprises:

sending one frame of electronic programming guide data on the fourth signal each time the third signal sends a predetermined number of video frames; and outputting a synchronization signal from the receiver to the first headset, the synchronization signal corresponding to the occurrence of the electronic programming guide frame in the fourth signal;

wherein the headset uses the synchronization signal to capture an image produced by the display device when the display device outputs an electronic programming guide frame and to hold the captured image when display device does not output an electronic programming guide frame.

In an embodiment, the display device includes the second display surface and the third signal is sent to the display device to produce a program service image; and the second display surface is a surface of an object external to the receiver and the fourth signal is sent to a projector component of the receiver which projects an electronic programming guide image onto the second display surface.

According to a further aspect of the present invention, there is provided a method of displaying an electronic programming guide, comprising:

outputting a video signal from a receiver to a display device, the video signal including program service content for display on the display device;

receiving a signal at the receiver, the signal including a command to display an electronic programming guide;

in response to receiving the signal, determining if there is at least one viewer of the display device that does not want to view the electronic programming guide; and in response to determining that there is at least one viewer that does not want to view the electronic programming guide, projecting the electronic programming guide from the receiver to a projection surface.

Preferably, the projection surface is external to the receiver.

In an embodiment, in response to determining that there is not at least one viewer that does not want to view the electronic programming guide, the method comprises displaying the electronic programming guide as an overlay onto the program service content displayed on the display device.

Preferably, the operation of determining if there is at least one viewer of the display device that does not want to view the electronic programming guide comprises:

applying face and/or eyeball tracking to a viewer of the display device to determine a location on the display device on which the viewer is substantially focused;

if the location on the display device on which the viewer is substantially focused does not correspond to a region in which the electronic programming guide image is displayed, determining that the user does not want to view the electronic programming guide; and if the location on the display device on which the viewer is substantially focused does correspond to a region in which the electronic programming guide image is displayed, determining that the user does want to view the electronic programming guide.

The operation of determining if there is at least one viewer of the display device that does not want to view the electronic programming guide may comprise receiving a command from a user input device that selects a mode of operation for the receiver;

evaluating the command that selects a mode of operation to determine whether a user has indicated that the electronic programming guide is not to be displayed on the display device.

Additionally, and/or alternatively, the operation of projecting the electronic programming guide from the receiver may comprise:

determining an approximate location of a viewer that does want to view the electronic programming guide; and projecting the electronic programming guide in proximity to the viewer that does want to view the electronic programming guide.

The present invention also extends to a method of displaying an electronic programming guide, comprising:

outputting a video signal from a receiver to a display device, the video signal including program service content for display on the display device;

inserting a frame that includes an electronic programming guide image into the video signal each time a predetermined number of frames of the video have been output; and outputting a synchronization signal from the receiver that indicates a display of the frame that includes the electronic programming guide image on the display device.

In an embodiment, the method further comprises:
receiving a first synchronization signal at a headset;
in response to receiving the first synchronization signal, capturing an image displayed on the display device at the headset; and
displaying the captured image through the headset until a second synchronization signal is received at the headset.

Preferably, the predetermined number of video frames is between 15 and 25, preferably between 19 and 21. In a preferred embodiment, the predetermined number of video frames is 20.

Preferably, the first headset includes an organic light emitting diode display.

In an embodiment, the first headset includes a camera.

Embodiments of the present invention will hereinafter be described, by way of example, with reference to the accompanying drawings, in which:

FIG. 1 schematically illustrates a service provider providing program transmissions to a receiver;

Embodiments described herein provide an electronic program guide to one or more viewers in manner that does not interfere with the viewing experience of others. In an embodiment, altered 3D output signals are used such that one frequency of the output signal contains an EPG data image and a second frequency of the 3D output signal contains visual content from a broadcast service transmission. In another embodiment, an EPG is periodically inserted into video stream during predetermined frames, which are then captured and held by a synchronized headset. In another embodiment, an EPG image is output through a projector onto a projection surface.

As used herein, a "receiver" is any device capable of receiving video and/or audio content included in a broadcast or other program service transmission from a service provider. As used herein, a service provider includes any service that provides a program service transmission to a receiver such as, without limitation, a satellite television service, a direct television service or a cable television service. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1:
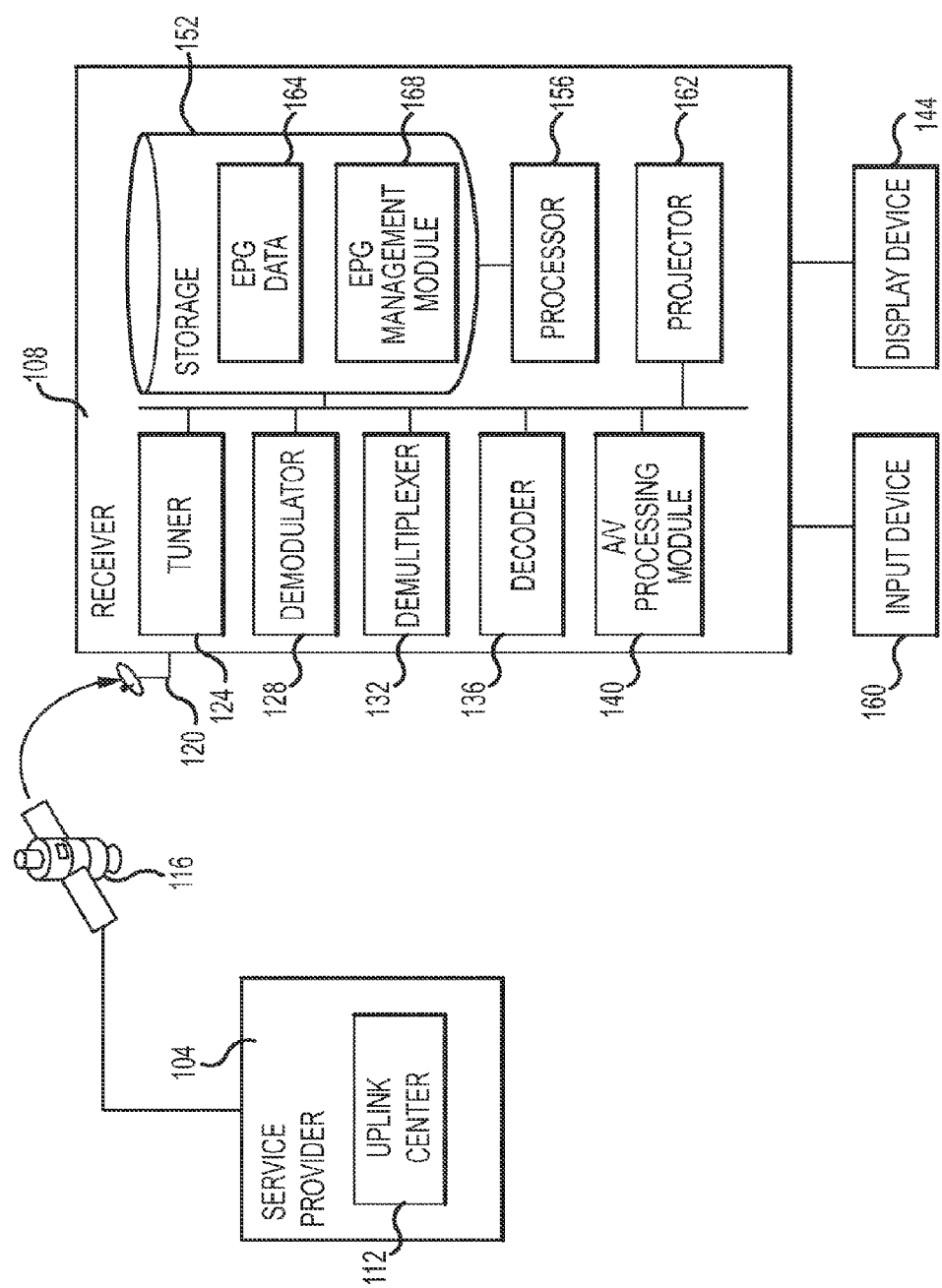

FIG. 1 shows a service provider 104 that transmits or otherwise provides a program service transmission to a receiver 108. The receiver 108 can include a set-top box (STB), Digital Video Recorder (DVR), a cable receiver, a general purpose computer and so on. The receiver 108 may also include a cable modem that receives streaming audio. The receiver 108 may be associated with an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements.

In the context of a satellite television service, the service provider 104 may provide a program service transmission through an uplink center 112. Implementations may utilize a direct broadcast satellite (DBS) system which can incorporate packetized transmission signals according to an appropriate standard, such as the MPEG-2 standard. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The modulated signal may be transmitted from the satellite 116 over an appropriate frequency band such as, for example, the C-band, the Ku-band or the Ka-band.

Direct broadcast satellite DBS signals may be received as downlinked signals by a satellite antenna 120. The downlinked signals may be received by a tuner 124, which selects a specific frequency range. The signals received by the tuner 124 may include a number of transponder signals received from one or more satellites 116. A particular transponder signal may include a combination or multiplex of a number of transport streams associated with one or more channels. A particular transport stream may include, for example, compressed or uncompressed audio or visual data. By applying band-pass filtering techniques, the tuner 124 may select a particular transponder signal from the group of signals received from a low noise block filter (LNBF), associated with the satellite antenna 120. The downlinked signals may be L-band.

The transponder signal selected by the tuner 124 may then be demodulated by the demodulator 128. Specifically, the demodulator 128 removes the sinusoidal carrier signal and outputs the information carrying signal as a baseband signal. Output from the demodulator 128 may be directed to a demultiplexer 132. The demultiplexer 132 may be an integrated circuit that accepts the packetized, time domain multiplexed data stream of the MPEG-2 transport stream and routes the packets to various components for further processing. In so doing, the demultiplexer 132 may separate out various transport streams that are contained in a particular transponder signal. A transport stream may include a number of packets having a unique packet identification (PID). In addition to routing packets of data, the demultiplexer 132 may also unscramble encrypted data and/or provide buffering of the MPEG data.

A number of transport streams may together form a service. As used herein, a "service" refers to a particular channel which is selected by a user. A particular video channel typically includes three transport streams: a video stream, an audio stream, and a data stream. When a user selects a service, for example, the demultiplexer 132 selects the appropriate audio and/or video transport stream and routes the audio and/or visual transport stream to a decoder 136, which may process the various transport streams that are output from the demultiplexer 132. The decoder 136 may include an audio decompressor portion that is operable to decompress an audio stream, and a video decompressor portion that is operable to decompress a video stream. The audio stream and video stream may be fully compliant audio and video program elementary streams as defined by, for example, ISO 13818-2 and ISO 13818-3 of the MPEG-2 standard, respectively. Output from the decoder 136 may be directed to an audio visual (A/V) processing module 140. The A/V processing module 140 may process the video and audio streams using digital-to-analog conversion techniques. or compressed digital to uncompressed digital conversion techniques, to produce one or more output signals. The resulting baseband signals may then be sent to a output device 144 through appropriate connections. By way of example, the output device 144 may include a television, a monitor, and/or a speaker system, and so on.

Embodiments may operate with different product transmission services. Accordingly, although a satellite system is provided as an example of a program service transmission system, it should be understood that other networks or broadcasts for transmitting data may be used. For example, embodiments may be implemented for a cable service. In this case, the service provider 104 and the receiver 108 may communicate over a communication path that includes various combinations of local and wide area networks and/or the Internet.

The display device 144 may be a three-dimensional (3D) television. A 3D television 144 may be provided in association with one or more headsets which are operable to process light projected from the display device 144 in order to present a three-dimensional image to the wearer of a headset. A "shutter" system may be used in which a 3D image is constructed by two images, one for each eye, that are displayed in rapid succession on the display device 144. The image for the right eye may be sent on a first frequency, and an image for the left eye may be sent on second frequency. The images may be sent using an appropriate data transmission protocol, such as High-Definition Multimedia Interface (HDMI). The images from the two frequencies may be interleaved or otherwise combined at the receiver 108 or at the display device 144 in order to produce a combined image produced by the display device 144.

Using liquid crystal display (LCD) or other similar technology, the lenses of a headset may be arranged to become either transparent or opaque in order to convey an image to a particular eye. Thus, in order to convey an image to the right eye, the right lens becomes transparent and the left lens becomes opaque. Similarly, in order to convey an image to the left eye, the left lens becomes transparent and the right lens becomes opaque. In this way, two separate images, each having a slightly different viewing angle, are sent in rapid succession to each eye. The viewer's brain interprets the difference between the images as depth and, in so doing, unites the two images into one three-dimensional picture. In order to accurately convey the separate images to the left and right eyes, the headset may receive a synchronization or trigger signal from the receiver 108 that indicates when the headset should make the lens transparent or opaque. A "headset" generally refers to a helmet or glasses or other eyewear that is arranged to process the three-dimensional signals, as appropriate.

The receiver 108 may additionally include a projector 162 for projecting an image on a surface that is external to the receiver 108. The projector may be used to project an EPG menu onto an external surface such as a table or a wall. In connection with projecting an EPG menu, the receiver 108 may include a face and/or eyeball tracking mechanism that is used to determine the location of a user who is viewing the EPG menu and/or to determine if a particular user is currently viewing the EPG menu. The projector 162 may be operable to directed the projected EPG menu in a particular direction or angle.

The receiver 108 may incorporate or use memory or other storage device 152, such as magnetic or optical storage. A storage device 152 may store data received from the decoded satellite signal. The storage device 152 may be volatile or non-volatile memory implemented using any suitable technique or technology such as, for example, random access memory (RAM), disk storage, flash memory, solid state and so on. The storage device 152 may be located within the receiver 108 or may be separate from the receiver 108. The storage device 152 may be removable. The stored data may include audio and/or visual content to be transmitted and output through the output device 144. Such audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 arranged to run executable code in connection with various functions associated with the receiver 108, and generally to cause the receiver 108 to function and the display device 144 to display images. For example, the processor 156 may display graphics, images, animations or other content through the output device 144. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

An EPG management module 168, which is stored in the storage device 152, may be executed by the processor 156 to control output of an electronic programming guide (EPG) in a manner that is directed to particular users and/or does not interfere with others' enjoyment of program service content. In so doing, the EPG management module 168 may process an electronic program guide data that is received at the receiver 108. The EPG data 168 may provide a schedule of program content and/or other features. As used herein, the terms "electronic programming guide" or "EPG" are intended to encompass an interface provided to a user as part of a program service transmission system that includes a schedule of programming content. The EPG may include a database or otherwise access a database containing information including, for example, names or titles of viewing or listening events (programs), corresponding channel numbers and names, brief descriptions of the programs, start and finish times, and rating and content information related to the events.

In addition to other functions, the EPG management module 168 may be arranged to output the EPG data 164 in a manner specifically directed to a particular user. The EPG management module 168 is able to alter a 3D output signal such that one frequency of the output signal contains the EPG data 164 and a second frequency of the 3D output signal contains visual content from the broadcast service transmission. Instead of directing separate images to different eyes, as is the case with 3D image output; the altered output signal may direct separate images to different headsets. Thus, the EPG management module may output separate synchronization or timing signals to the separate headsets. A first synchronization signal causes a first headset to make both of its lenses transparent when the EPG image is displayed, and both of its lenses opaque when the content from the broadcast service transmission is displayed. Similarly, a second synchronization signal causes a second headset to make both of its lenses transparent when content from the broadcast service transmission is displayed, and both of its lenses opaque when the EPG image is displayed.

The EPG management module 168 may be arranged to output the EPG data 164 periodically at predetermined frames. The EPG management module 168 may additionally output a synchronization signal to one or more headsets which provides timing information operable to allow the headset to capture the periodically displayed EPG image. The EPG management module 168 is operable to output EPG data 164 through the projector 162.

The processor 156 may also perform such tasks as executing commands received from a user. User commands may be sent to the receiver 108 through a user input device 160 such as remote or other wireless device. As used herein, a "user input device" may include any device operable to receive input from a user and to convey the input to the receiver 108. The user input device 160 may be a hand-held device having a number of buttons or keys which, when actuated by a user cause the user input device to covey information to the receiver 108 using a suitable communication means, such as an infrared signal. The user input device 160 may include a pointing device or functionality that allows the user to control the position of a cursor that is displayed on the output device 144. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It will be appreciated that other input devices such as a computer mouse or touch screen may be used and other communication means, wired or wireless, may be used. Information sent to the receiver 108 may include, for example, a command to change the output channel, a command to display a EPG and/or a command to navigate through the EPG.

Figure 2:
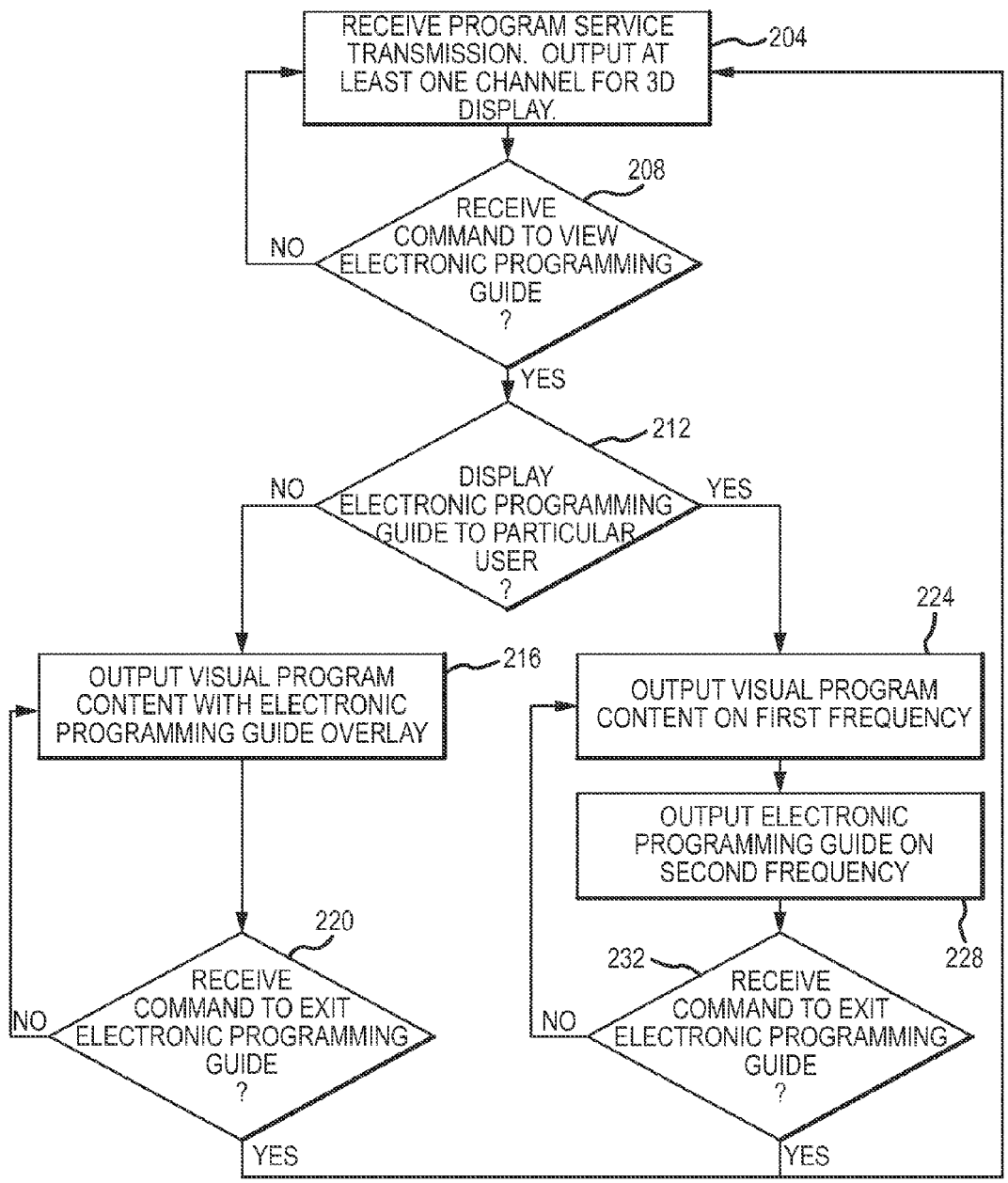
FIG. 2 is a flow chart illustrating a method of outputting an EPG image.

FIG. 2 is a flow chart illustrating a method of outputting an EPG image. Initially, at operation 204, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 204 includes outputting at least one channel from the program service transmission for display on the display device 144. The channel output in operation 204 may be a three-dimensional video signal. Following operation 204, operation 208 is executed.

In operation 208, the EPG management module 168 determines if a signal has been received from the input device 160 that commands the receiver 108 to display electronic programming guide data. If, in operation 208, no such command signal is received, operation 204 may follow such that program service content is continually received and displayed by the receiver 108. If, in operation 208, a command to view the electronic programming guide is received, operation 212 may be executed.

In operation 212, the EPG management module 168 determines if the EPG image is to be output to a particular user. The user input device 160 may be operable to receive a command that indicates the manner in which the EPG image is to be output. In one mode, the EPG image may be output in the familiar manner, such that the image is overlain on top of other visual content. In another mode, the EPG image may be output to a particular user. Accordingly, if in operation 212, the EPG management module 168 determines that the EPG image is to be displayed to all users, operation 216 may be executed. In operation 216, the EPG data is output on top of or overlain on the program service channel that is currently output on the display device 144. Following operation 216, operation 220 may be executed.

In operation 220, the EPG management module 168 determines if a signal has been received from the input device 160 that commands the receiver 108 to exit from the EPG guide display. If, in operation 220, no such signal has been received by the receiver 108, operation 216 may be executed following operation 220 such that the EPG image remains displayed on the display device 144. If, in operation 220, an exit command is received, operation 204 may be executed following operation 220 such that a program service channel is output to the display device 144 without also displaying an EPG image.

If, in operation 212, the EPG management module 168 receives a command to display the EPG data 164 to a particular user, then operation 224 may follow operation 212. In operation 224, the channel or other visual content from the program service transmission is output from the receiver 108 on a first frequency. In outputting the channel or other visual content on the first frequency, the EPG management module 168 makes the visual content available to one or more users that are wearing a particular headset that is operable to receive that frequency. In so doing, the visual image seen by the user may shift from a three-dimensional image to a two-dimensional image. The signal carrying the first frequency and the signal carrying the second frequency may be combined at the receiver and sent to the display device as a combined signal. Alternatively, these signals may be sent separately from the receiver 108 to be combined together at the display device 144. Following or concurrently with operation 224, operation 228 may be executed. In operation 228, the EPG management module 168 may output a signal containing the EPG image on a second frequency. In so doing, the EPG management module 168 may make the EPG image visible or otherwise available to be seen by one or more individuals who are viewing the display device 144 with a headset operable to view the second frequency. As can be appreciated, the EPG data 164, like the program service output, is viewed to such a user as a two-dimensional image. Following operation 228, operation 232 may be executed.

In operation 232, the EPG management module 168 determines if a signal has been received by the receiver 108 that commands the receiver 108 to exit the electronic programming guide menu. If, in operation 232, no such command is received, operation 224 may be executed following operation 232 such that the visual content from the program service transmission and the EPG guide data are each output on separate frequencies. If, in operation 232, an exit command is received by the receiver 108, operation 204 may be executed following operation 232. Once operation 204 is again executed, the visual image received or seen by the first user may shift from a two-dimensional image back to a three-dimensional image. It should be appreciated that in the instance where the user, in operation 212, selects an electronic programming guide output to all users, the display of that data in operation 212 may be seen as a three-dimensional image along with other visual content that is concurrently shown.

Figure 3:
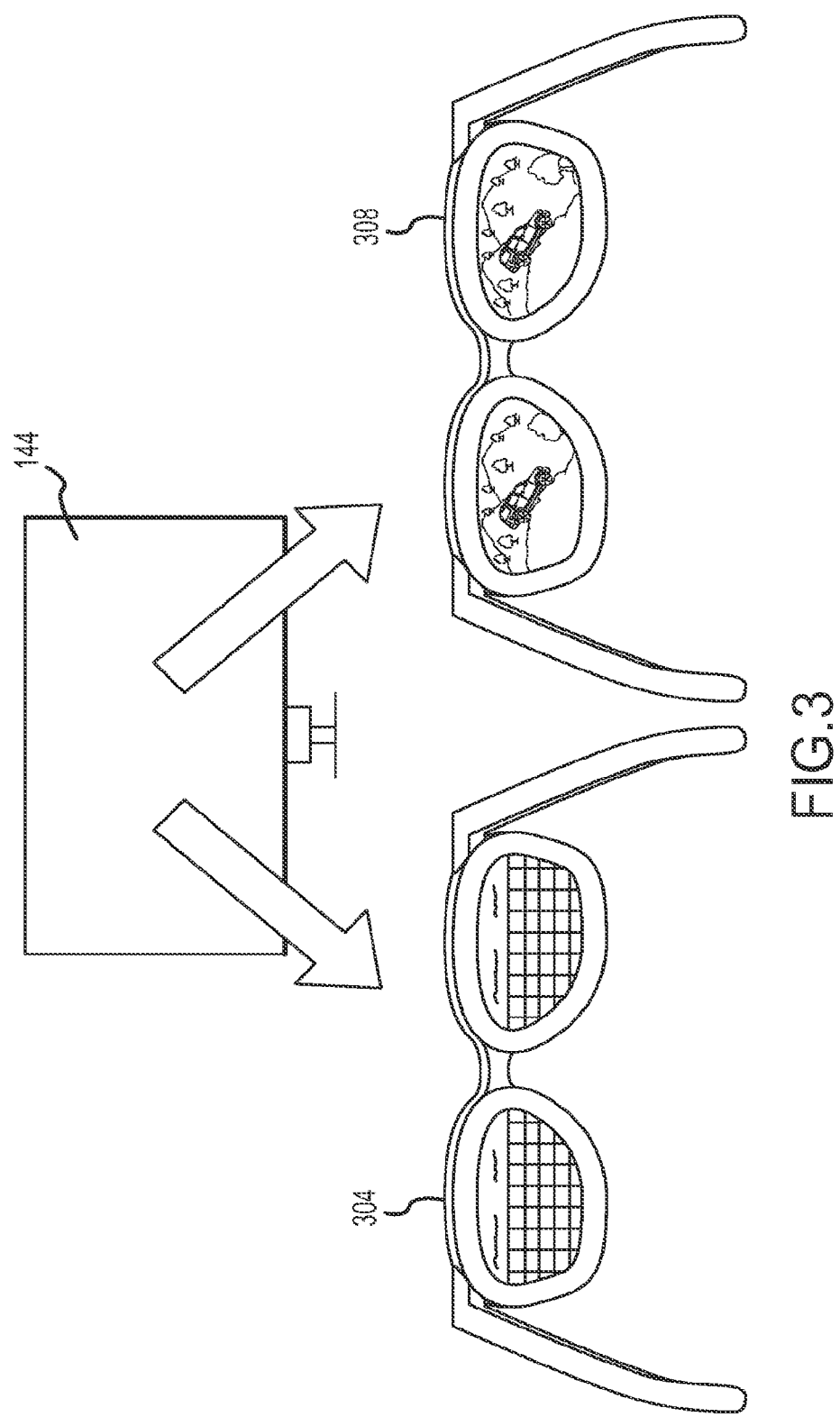
FIG. 3 is an illustration of a visual output in accordance with a method as illustrated in FIG. 2.

FIG. 3 illustrates the visual output resulting from the method of FIG. 2. FIG. 3 includes a display device 144 that is provided in association with two headsets 304 and 308. The visual image produced by the headset 304 and the headset 308 corresponds to the output from the receiver 108 in operations 224 and 228, shown in FIG. 2. As can be seen in FIG. 3, each headset 304 and 308 is used to view the same projection surface, namely the screen of the display device 144. However, due to the filtering process associated with the headsets 304 and 308, each headset views a different image. The output from the display device 144 is a combination of both images seen through headsets 304 and 308. The headset 304 is operable to filter out the image that is viewed on the headset 308, namely the visual content from the broadcast service transmission. In so doing, the headset 304 is operable to pass through and thereby display the EPG data 164, which is transmitted on the first frequency. Similarly, the headset 308 is operable to filter out the content sent on the first frequency, and operable to pass through and thereby display content on the second frequency. Accordingly, through the headset 308, the visual content from the broadcast service transmission is visible as described above because only a single frequency is passed through the headset 308. The image seen therein is a two-dimensional rather than a three-dimensional image.

Figure 4:
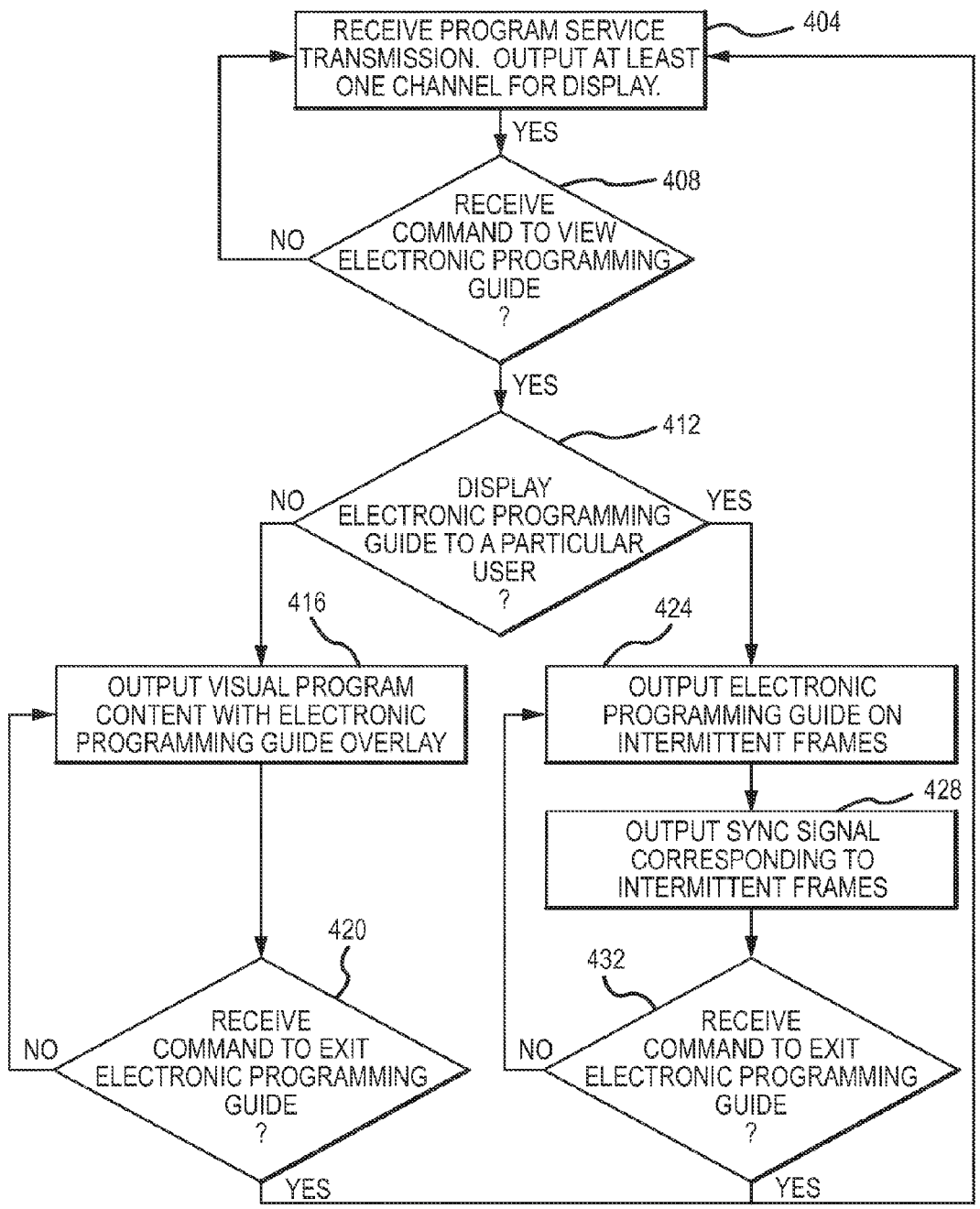
FIG. 4 is a flow chart which illustrates another method of outputting an EPG image.

FIG. 4 is a flow chart illustrating a further method of outputting an EPG image. Initially, at operation 404, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 404 includes outputting at least one channel from the program service transmission for display on the display device 144. Following operation 404, operation 408 may be executed.

In operation 408, the EPG management module 168 determines if a signal has been received from the input device 160 that commands the receiver 108 to display electronic programming guide data. If, in operation 408, no such command signal is received, operation 404 may follow such that program service content is continually received and displayed by the receiver 108. If, in operation 408, a command to view the electronic programming guide is received, operation 412 may be executed.

In operation 412, the EPG management module 168 determines if the EPG image is to be output to a particular user. In this regard, the user input device 160 may be operable to receive a command that indicates the manner in which the EPG image is to be output. In one mode, the EPG image may be output in the familiar manner, such that the image is overlain on top of other visual content. In another mode, the EPG image may be output to a particular user.

Accordingly, if in operation 412, the EPG management module 168 determines that the EPG image is to be displayed to all users, operation 416 may be executed. In operation 416, the EPG data is output on top of or overlain on the program service channel that is currently output on the display device 144. Following operation 416, operation 420 may be executed.

In operation 420, the EPG management module 168 determines if a signal has been received from the input device 160 that commands the receiver 108 to exit from the EPG guide display. If, in operation 420, no such signal has been received by the receiver 108, operation 416 may be executed following operation 420 such that the EPG image remains displayed on the display device 144. If, in operation 420, an exit command is received, operation 404 may be executed following operation 420 such that a program service channel is output to the display device 144 without also displaying the EPG data 164.

If, in operation 412, the EPG management module 168 receives a command to display the EPG data 164 to a particular user, then operation 424 may follow operation 412. In operation 424, the EPG management module 168 is operable to output the EPG data 164 intermittently on selected frames. In one embodiment, the EPG management module outputs the EPG data 164 on a frame that is between every 15th and every 25th frame. In another embodiment, the EPG management module outputs the EPG data 164 on a frame that is between every 19th and every 21th frame. In still other embodiments, the EPG management module 168 outputs the EPG data on every 20th frame. Following operation 424, operation 428 may be executed.

In operation 428, the EPG management module 168 may output a synchronization signal to one or more headsets, which are used to view the display device 144. The synchronization signal sent by the EPG management module 168 is used by the headset for timing purposes in order to capture the intermittent frames of EPG images displayed on the display device 144. Specifically, once a synchronization signal is received by the headset, the headset captures and holds the frame having the EPG image. Once the EPG data frame is captured, the headset holds the captured frame until the next synchronization signal is received and the next EPG data frame is captured. Following operation 428, operation 432 may be executed.

In operation 432, the EPG management module 168 determines if a signal has been received by the receiver 108 that commands the receiver 108 to exit the electronic programming guide menu. If, in operation 432, no such command is received, operation 224 may be executed following operation 432 such that the visual content from the program service transmission and the EPG guide data are each output on separate frequencies. If, in operation 432, an exit command is received by the receiver 108, operation 404 may be executed following operation 432.

Figure 5:
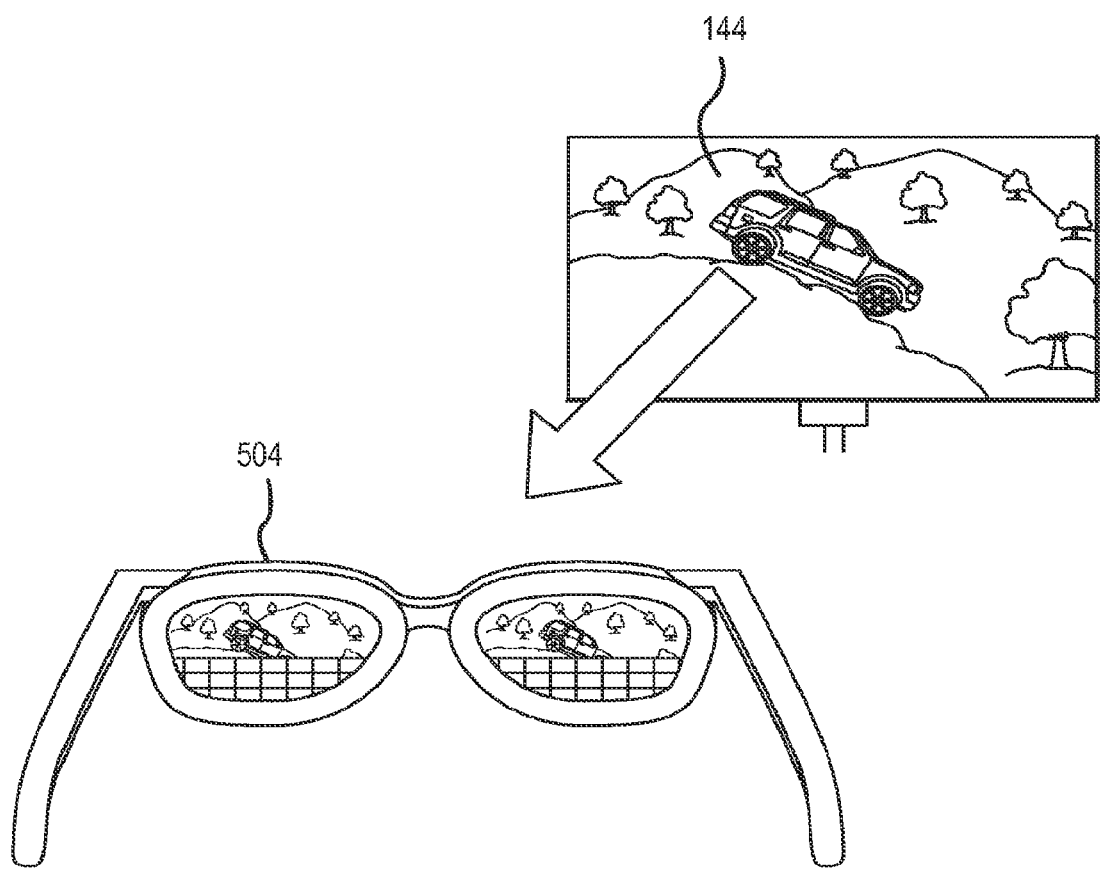
FIG. 5 is an illustration of a visual output in accordance with a method as illustrated in FIG. 4.

FIG. 5 illustrates visual content output by way of a method as illustrated in FIG. 4. FIG. 5 includes a display device 144 and a headset 504. The visual content displayed in FIG. 5 corresponds to output from the receiver 108 during operations 424 and 428. As can be seen in FIG. 5, the display device 144 outputs visual content from the program service transmission. Concurrently with this output, EPG data 164 is output through the display device 144 on intermittent visual frames. Because the EPG data is shown only on select frames, the EPG image is not visible to the unaided eye. Specifically, the EPG data appears and disappears too quickly to be seen by the unaided eye.

FIG. 5 additionally includes a headset 504 that is operable to catch the intermittent EPG image output through the display device 144. As described in connection with FIG. 4, the headset 504 receives a synchronization signal from the EPG management module 168 which provides timing information for the headset 504 to capture the intermittent EPG image output from the display device 144. Accordingly, as can be seen in FIG. 5, the image seen through the headset 504 is a combination of the visual content from the broadcast or program service transmission and the captured EPG image. In order to capture the EPG image, the headset 504 may employ an organic light emitting diode (OLED) in one embodiment. In another embodiment, the headset may employ the use of a camera.

Figure 6:
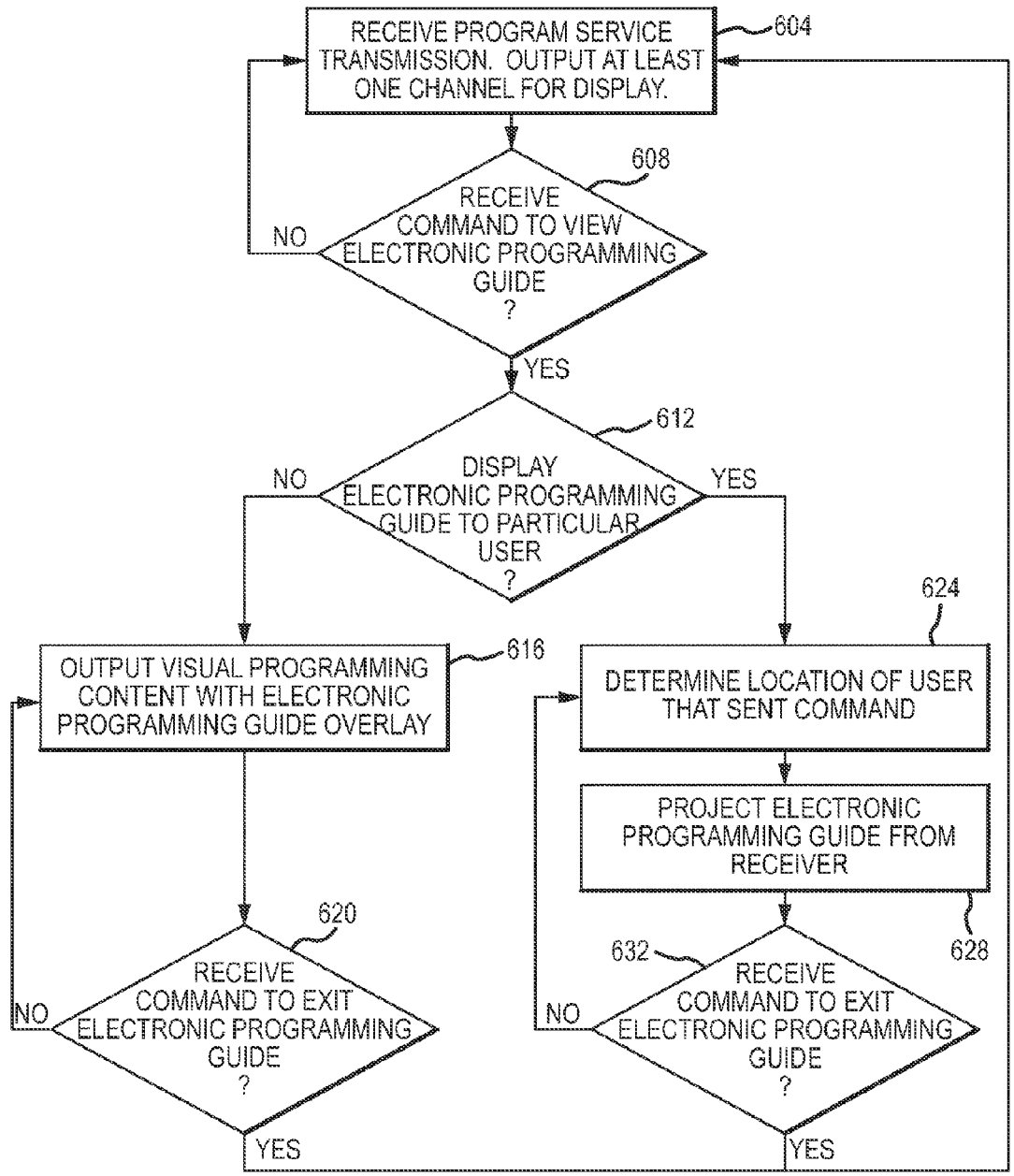
FIG. 6 is a flow chart that illustrates a further method of outputting an EPG image.

FIG. 6 is a flow chart that illustrates a further method of outputting an EPG image. Initially, at operation 604, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 604 includes outputting at least one channel from the program service transmission for display on the display device 144. Following operation 604, operation 608 may be executed.

In operation 608, the EPG management module 168 determines if a signal has been received from the input device 160 that commands the receiver 108 to display electronic programming guide data. If, in operation 608, no such command signal is received, operation 604 may follow such that program service content is continually received and displayed by the receiver 108. If, in operation 608, a command to view the electronic programming guide is received, operation 212 may be executed.

In operation 612, the EPG management module 168 determines if the EPG image is to be output to a particular user. In this regard, the user input device 160 may be operable to receive a command that indicates the manner in which the EPG image is to be output. In one mode, the EPG image may be output in the familiar manner, such that the image is overlain on top of other visual content. In another mode, the EPG image may be output to a particular user.

In other embodiments, a user's desire to view or to not view an EPG may be determined apart from any specific input from the user. For example, the EPG management module 168 may applying face and/or eyeball tracking to a viewer of the display device to determine a location on the display device on which the viewer is substantially focused. If the location on the display device on which the viewer is substantially focused does not correspond to a region in which the electronic programming guide image is displayed, the EPG management module may determine that the user does not want to view the electronic programming guide. On the other hand, if the location on the display device on which the viewer is substantially focused does corresponded to a region in which the electronic programming guide image is displayed, the EPG management module may determine that the user does want to view the electronic programming guide.

If, in operation 612, the EPG management module 168 determines that the EPG image is to be displayed to all users, operation 616 may be executed. In operation 616, the EPG data is output on top of or overlain on the program service channel that is currently output on the display device 144. Following operation 616, operation 620 may be executed.

In operation 620, the EPG management module 168 determines if a signal has been received from the input device 160 that commands the receiver 108 to exit from the EPG guide display. If, in operation 620, no such signal has been received by the receiver 108, operation 616 may be executed following operation 620 such that the EPG image remains displayed on the display device 144. If, in operation 620, an exit command is received, operation 604 may be executed following operation 620 such that a program service channel is output to the display device 144 without also displaying the EPG data 164.

If, in operation 612, the EPG management module 168 receives a command to display the EPG data 164 to a particular user, then operation 624 may follow operation 612. In operation 624, the EPG management module 168 is operable to determine a location of a user, specifically the receiver 108 may employ techniques such as face recognition or eyeball scanning to determine the location and perspective in which a user will view a surface on which the EPG data will be projected. Following operation 624, operation 628 may be executed. In operation 628, the EPG management module 168 is operable to project the EPG data 164 through the projector 162.

In operation 632, the EPG management module 168 determines if a signal has been received by the receiver 108 that commands the receiver 108 to exit the electronic programming guide menu. If, in operation 632, no such command is received, operation 624 may be executed following operation 632 such that the visual content from the program service transmission and the EPG guide data are each output on separate frequencies. If, in operation 632, an exit command is received by the receiver 108, operation 604 may be executed following operation 632.

Figure 7:
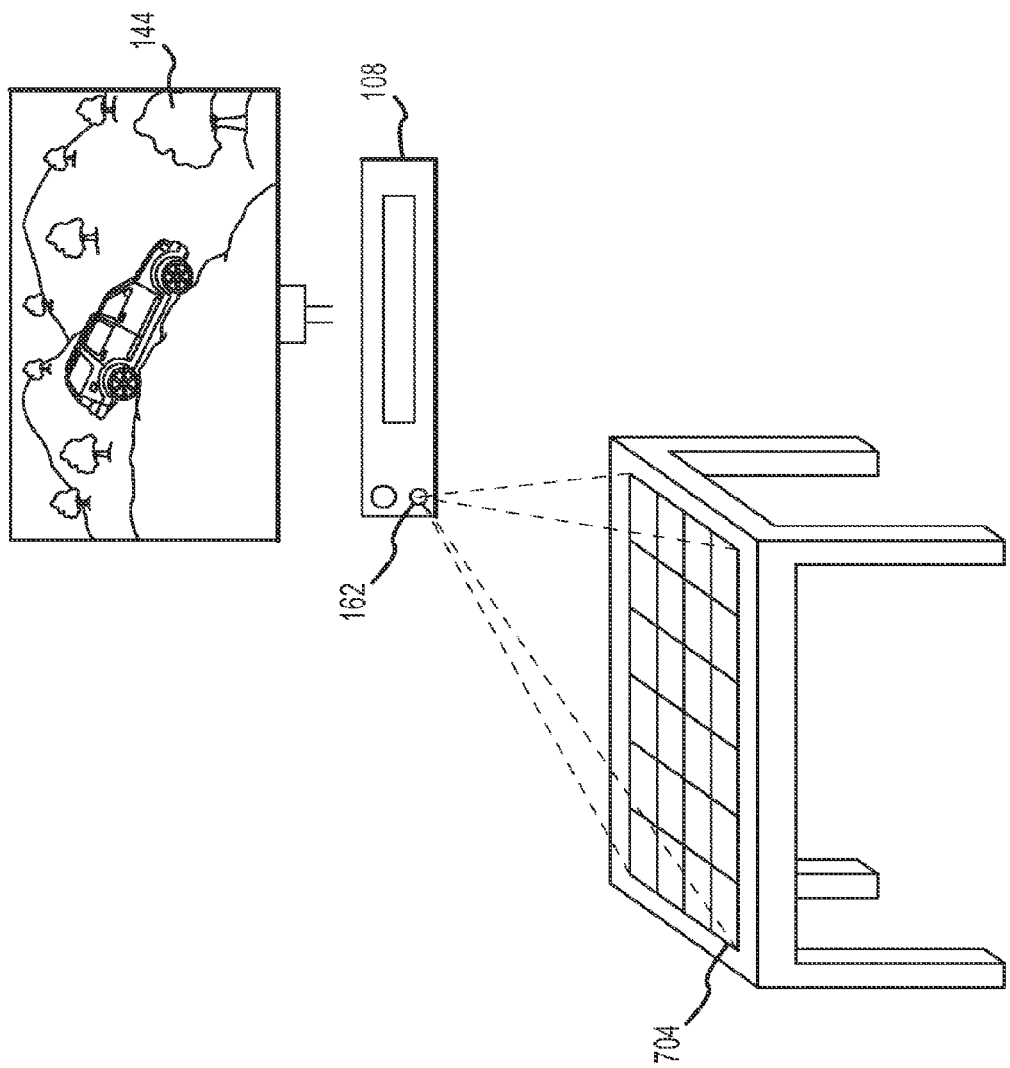
FIG. 7 is an illustration of a visual output in accordance with a method as illustrated in FIG. 6.

FIG. 7 is an illustration of a visual output from the receiver 108 arising from a method as in FIG. 6. FIG. 7 includes a display device 144 and a receiver 108. The display device 144 outputs visual content from the program service transmission. Concurrently with this output of a program service channel, the receiver 108 projects an EPG image on a projection surface 704. As illustrated in FIG. 7, the projection surface 704 may be a table which is nearby or in close proximity to the receiver 108. In other embodiments, the projection surface 704 may be a wall, floor, ceiling, and so on.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 4 and FIG. 6, may be changed.

It will be appreciated that variations in, and modifications of, the embodiments as described and illustrated may be made within the scope of the appended claims.

The invention claimed is:

1. A method of displaying an electronic programming guide, comprising:
    outputting a video signal from a receiver to a display device, the video signal including program service content for display on the display device, wherein the receiver further comprises an image projector that is configured to project an image at a particular direction or angle outwardly from the receiver an onto a projection surface that is physically separate and spaced apart a distance from the receiver and the display device;
    receiving a command signal at the receiver, the command signal including a command to display an electronic programming guide;
    in response to receiving the command signal, determining that there is at least one viewer of the display device who does not want to view the electronic programming guide; and
    in response to determining that there is at least one viewer who does not want to view the electronic programming guide, using the image projector of the receiver, projecting the electronic programming guide from the image projector of the receiver to the projection surface that is physically separate and spaced apart a distance from the receiver and display device, wherein the projection surface is also positioned at the particular direction or angle outwardly from the receiver.

2. The method of claim 1, wherein the operation of determining that there is at least one viewer of the display device who does not want to view the electronic programming guide comprises:
    applying face and/or eyeball tracking to a viewer of the display device to determine a location on the display device on which the viewer is substantially focused;
    if the location on the display device on which the viewer is substantially focused does not correspond to a region in which the electronic programming guide image is displayed, determining that the user does not want to view the electronic programming guide; and
    if the location on the display device on which the viewer is substantially focused does correspond to a region in which the electronic programming guide image is displayed, determining that the user does want to view the electronic programming guide.

3. The method of claim 1, wherein the operation of determining that there is at least one viewer of the display device who does not want to view the electronic programming guide comprises:
    receiving a command from a user input device that selects a mode of operation for the receiver;
    evaluating the command that selects a mode of operation to determine whether a user has indicated that the electronic programming guide is not to be displayed on the display device.

4. The method of claim 1, wherein the operation of projecting the electronic programming guide from the receiver comprises:
    determining an approximate location of a viewer who does want to view the electronic programming guide; and
    projecting the electronic programming guide in proximity to the viewer who does want to view the electronic programming guide.

5. The method of claim 1, wherein the projection surface is selected from the group consisting of: a wall, a floor, and a ceiling.

* * * * *